United States Patent [19]
Ballester

[11] Patent Number: 5,824,256
[45] Date of Patent: Oct. 20, 1998

[54] METHOD OF MOLDING A THERMOPLASTIC CONTAINER

[75] Inventor: Jose F. Ballester, Guaynabo, Puerto Rico

[73] Assignee: Fortiflex, Inc., Bayamon, Puerto Rico

[21] Appl. No.: 760,488

[22] Filed: Dec. 5, 1996

[51] Int. Cl.$^6$ .................................................. B29C 45/44
[52] U.S. Cl. ...................... 264/318; 264/328.1; 264/334; 264/335; 425/577; 425/DIG. 58
[58] Field of Search ................................. 264/318, 328.1, 264/334, 335, 336; 425/577, DIG. 58, 556; 249/59, 60

[56] References Cited

U.S. PATENT DOCUMENTS

| | | | |
|---|---|---|---|
| 2,921,343 | 1/1960 | Mumford | 264/318 |
| 3,325,576 | 6/1967 | Kessler | 264/318 |
| 3,977,563 | 8/1976 | Holt . | |
| 4,125,246 | 11/1978 | Von Holdt | 425/577 |
| 4,383,819 | 5/1983 | Letica | 425/577 |
| 4,521,367 | 6/1985 | Underwood | 264/318 |
| 4,552,328 | 11/1985 | Dutt et al. | 425/577 |
| 4,676,732 | 6/1987 | Letica | 425/577 |
| 4,777,004 | 10/1988 | Galer | 425/577 |
| 5,340,304 | 8/1994 | Nakamura | 425/577 |

*Primary Examiner*—Jill L. Heitbrink
*Attorney, Agent, or Firm*—William Squire; John N. Bain

[57] ABSTRACT

A male member has a cylindrical core with an internal poppet that is displaced by air pressure to open an air passage for pressurized air to an end of the poppet. The female cavity and poppet form a container bottom wall. A thermoplastic copolymer polyethylene is injected into the mold at about 470° F., the mold having a surface temperature of about 100°–130° F. and the plastic material a temperature of about 130°–160° F. at the time of ejection of the container from the mold. Ribs are formed at the container rim having a depth such as to cause the container to stretch about 6% when removed from the core. The ribs outer edges are coextensive with the container side wall. A lid engaging lip is formed at the container rim edge. The process has a preferred 14 second cycle time and uses a core with no draft. The mold surface is maintained at the desired temperature by a cooling water circuit in the mold.

20 Claims, 5 Drawing Sheets

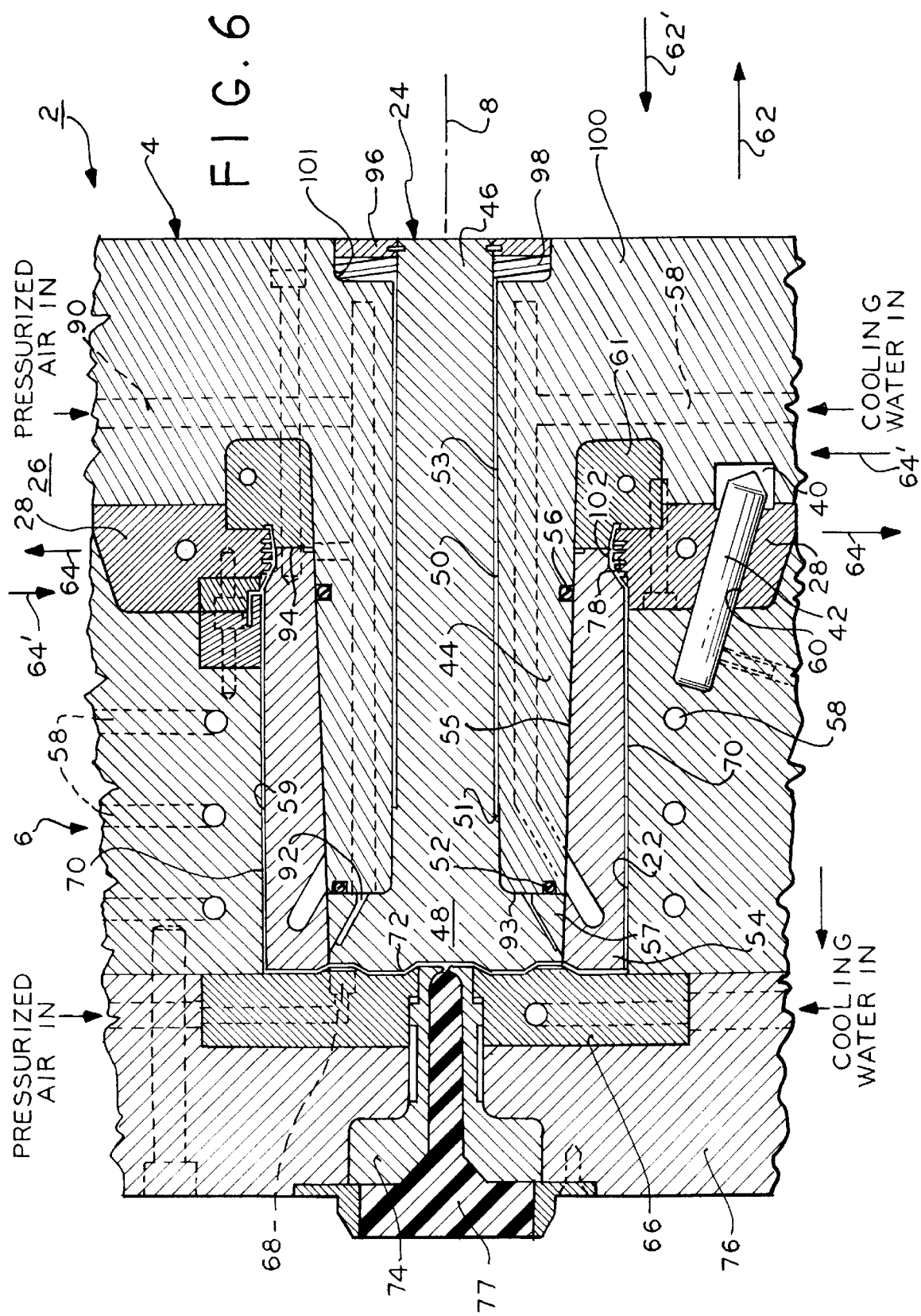

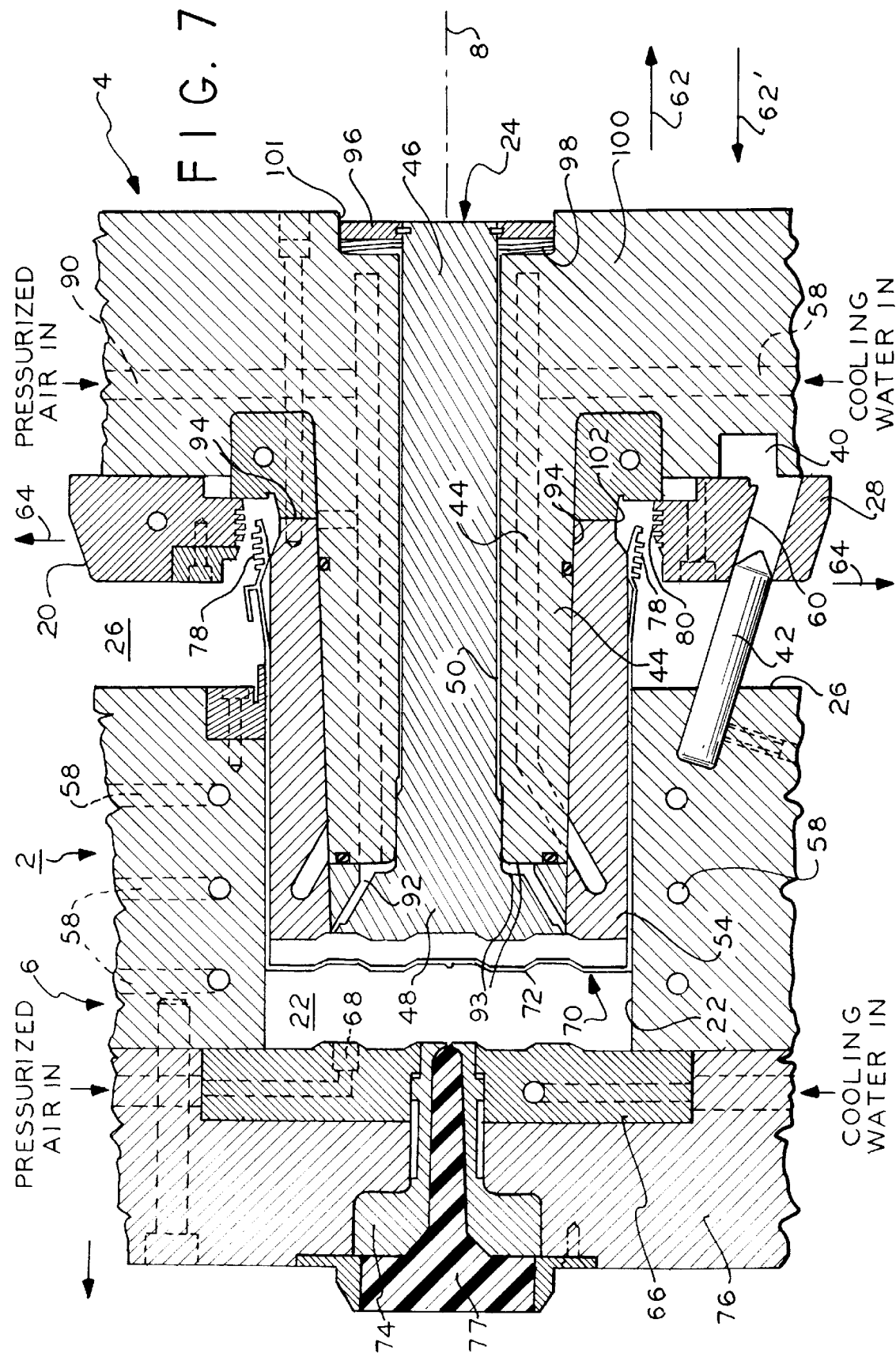

METHOD OF MOLDING A THERMOPLASTIC CONTAINER

BACKGROUND OF THE INVENTION

1. Field of the Invention

This invention relates to molding thermoplastic containers, and in particular, to molding by injection molding a polyethylene container for use, for example, for storing paint.

2. Description of Related Art

Molded polyethylene containers are known. Typically these are injected molded in a mold comprising a male member that is inserted into a female member cavity. A container for paint for example requires a lid to be attached for sealing the contents. The container therefore has a rim with a lip for attaching the lid thereto. Because such containers are flexible, it is necessary to prevent the rim at the lid from distorting when the container is filled with liquid such as paint. If the rim ovalizes, that is becomes non-circular, e.g., oval, in shape, a leakage area develops at the lid for the liquid to escape. The lid also might disengage the container. Often, in storage, such containers might be dropped. Such dropping places causes the liquid contents to stress the container and may ovalize it at the rim undesirably.

To preclude such undesirable distortion at the rim, the art molds annular ribs adjacent to the rim and extending radially outwardly. Normally, the female mold has segments that move radially outwardly during ejection of the container so that the mold does not interfere with the ejection, which is in an axial direction. However, such ribs can not practically protrude beyond the circular cylindrical surface of the container outer surface. The ribs must be coextensive with that outer cylindrical surface. The reason for this is that the outer surface including the ribs must define a single cylinder to permit efficient stacking and packing of the containers. If the ribs protruded radially beyond the container outer cylindrical surface, they would unnecessarily waste storage space and result in oversize packing materials with unused space between a major portion of the container sidewalls.

Also, importantly, the thermoplastic container must be compatible with present metal paint can configurations. This means the molded container must be usable with present metal can filling equipment and handle assembly equipment for attaching the wire bail to the container. Further, the container must be compatible with present metal can packaging and the equipment for such packaging.

Therefore, the art recesses the ribs so that the ribs radial outer edges are coextensive with the container remaining outer cylindrical surface. This in turn requires that the rim region of the container have a radially inwardly extending portion that is aligned with the ribs to accommodate the ribs and permit the ribs to be flush with the remaining container outer wall surface.

The inwardly extending portion at the rim creates a problem. Since the container is formed between a male and female member, the male member needs an undercut groove distal the male member end to receive the inwardly extending portion at the ribs, which end is adjacent to and forms the container bottom wall. During ejection of the container, the container needs to be slid axially of f of the male member toward the male member end away from the groove. The male member has a diameter between its end and the groove that is greater than the diameter of the groove bottom wall. When the container is slid off of the male member, the male member greater diameter expands and stretches the rim portion of the container with the radially inwardly extending portion.

In the prior art, such stretching is believed allowable only up to about 4% employing conventional thermoplastic material for paint containers such as a polyethylene copolymer, e.g., ethylene with hexene. Homopolymer materials are stiffer and have lower stress crack resistance and thus may exhibit stress cracks. Consequently, for conventional one gallon size paint containers, having a nominal diameter of about 6.5–7 inches and a length of about 7–8 inches, the maximum rib depth in the radial outward direction is about ⅛ (0.125) inches. This requires a corresponding depth in the male member complementary mold groove.

It is believed that this depth of the ribs provides insufficient hoop strength to the container rim that is satisfactory for use with paints. That is, the rims tend to ovalize. The alternative solution to providing a groove in the male member is to provide an articulating male member with radially displacable segments. These segments then displace radially inwardly out of the way of the radially inwardly extending portion. Such movable segments are costly to implement, costly to maintain and wear rapidly. This adds to the cost of the resulting product. They also may create unsightly parting lines and potentially undesirable flash along the container length.

A particular polyethylene material is desired for paint containers because paints have components which may attack the plastic material. The plastic material needs to have physical properties to resist wetting agents in the paint which are relatively aggressive in attacking high density polyethylene. It is this material that exhibits limitations in stretching that results in the more costly use of articulated male members.

SUMMARY OF THE INVENTION

The present invention is a recognition that conventional polyethylene thermoplastic material can be molded into a container for use, for example, as a container for paint in an injection molding environment beyond the stretching limits of what is generally known in this art by those of ordinary skill.

A method of molding a thermoplastic cylindrical container according to the present invention includes forming by injection molding in a mold having engaged female and male members a one piece polyethylene copolymer thermoplastic material cylindrical container having a bottom wall and an annular side wall extending from the bottom wall and terminating at a annular rim, the male member having an annular one piece surface for forming the interior surface of the side wall. The method further includes forming during the injection molding at least one rib extending radially outwardly from the side wall adjacent to the rim and forming during the injection molding in the side wall a radially inwardly extending portion aligned with the at least one rib, the inwardly extending portion extending a radially inward distance from the side wall an amount sufficient that causes the side wall to stretch at least about 6% during ejection of the container from the male member.

In one embodiment, the step of forming the at least one rib includes forming a plurality of annular ribs.

In another embodiment, the forming of the side wall includes forming the side wall with a thickness of about 0.020 to 0.075 inches and the forming the radially inwardly extending portion includes forming the inwardly extending portion about 0.150 inches radially inwardly from the side wall with a depth to diameter ratio of at least about 1 to 17.

In a further embodiment, the step of forming the container includes forming the container so that the thermoplastic material of the container after it is formed and still in the mold has a temperature of about 130° F to 160° F.

In a still further embodiment, the step of forming the container includes disengaging the male member from the female member and ejecting the container from the male member with pressurized air during the disengaging.

BRIEF DESCRIPTION OF THE DRAWING

FIG. 6 is a sectional elevation view of the engaged male and female members of the mold used to practice the method of the present invention;

FIG. 7 is a sectional view similar to that of FIG. 6 showing the commencement of ejection of the container from the male member in the ejection cycle.

DETAILED DESCRIPTION OF THE PREFERRED EMBODIMENTS

Figure 1:
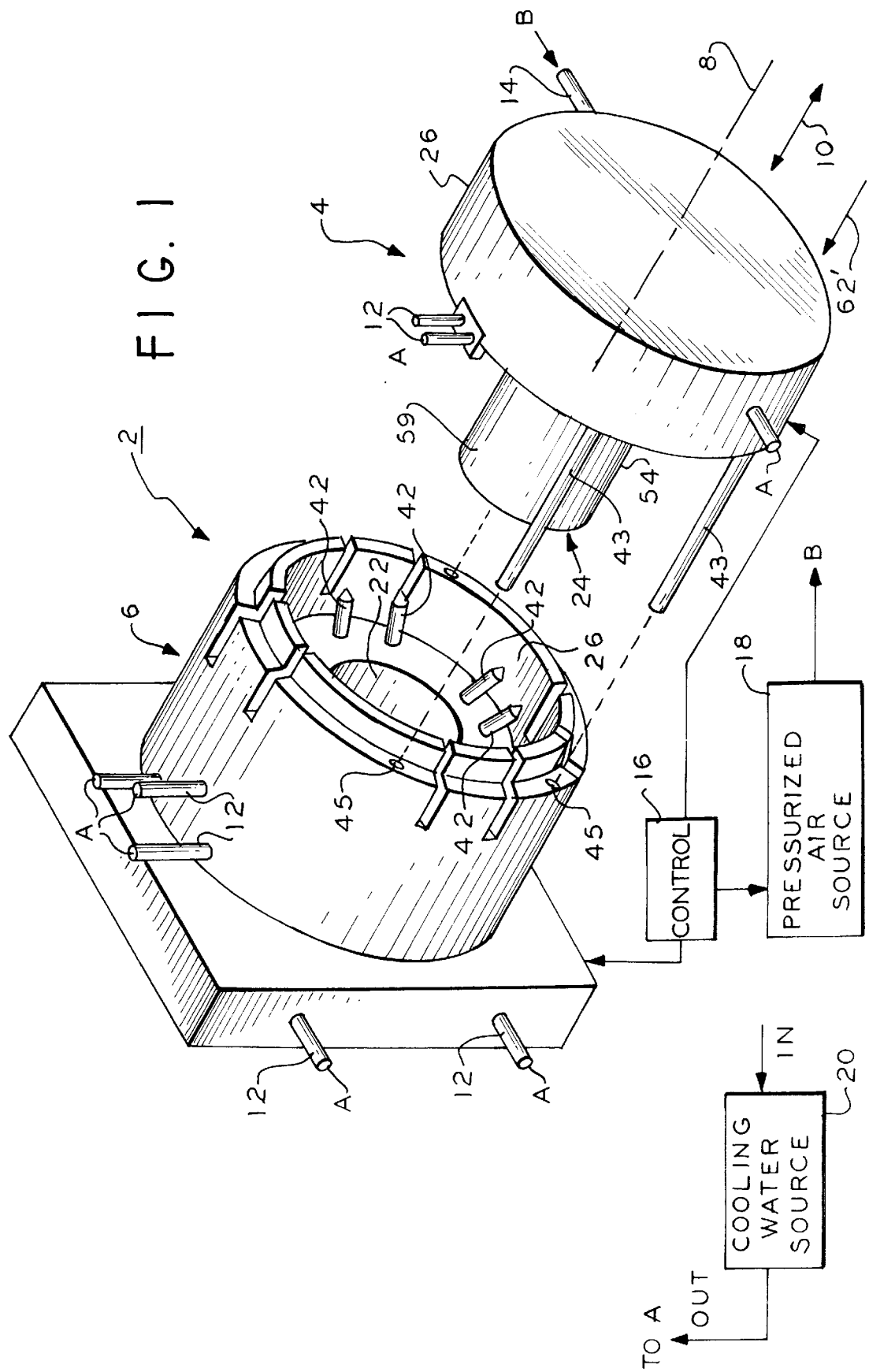
FIG. 1 is an isometric view of a portion of an injection mold and a diagram illustrating male and female mold members for implementing an embodiment of the present invention.

In FIG. 1, mold 2, comprises a male member 4 and a female member 6. Not shown are the attached apparatus for supporting the male and female members and for axially displacing the male member 4 along axis 8 during a typical mold cycle in directions 10. Shown are a few of the cooling water inlet and outlet lines 12 at points A. Also shown is air line 14 for receiving pressurized air at point B. The mold 2 is operated by control 16. The control 16 operates the supply of air from air source 18 and water source 20. The control also moves the male member 4 into and out of engagment with the female member 6. Only a few of the water and air lines are illustrated for purposes of clarity of illustration. In practice many other lines and conduits (not shown) in the mold members are employed in the injection mold apparatus 2.

Also, not shown is a source of thermoplastic material used to feed the material into the female cavity 22 of the female member 6. This includes apparatus for melting the plastic material and for screw feeding the material into the cavity 22. The female member 6 is normally stationary and the male member 4 is axially movable in directions 10 into and out of the cavity 22 in an injection mold cycle.

The thermoplastic material is the aforementioned polyethylene copolymer which is supplied at a temperature of about 470° F, but may be cooler according to a given implementation. A screw (not shown) having a helix of about 17° (one turn per one diameter axial length of the screw) feeds, heats and plasticizes the thermoplastic material fed into the female cavity. The cooling water is supplied preferably about 45° to 50° to various conduits located in the female and male mold members some of which are shown in others of the Figures. Activators (not shown) displace the male member along guides (not shown).

The male member 4, which may be stainless steel, includes a core 24, which may be stainless steel or beryllium copper, axially mates with cavity 22 in the female member 6. The female member 6 includes a larger diameter cavity 26 which receives the radially displacable jaw segments 28, FIG. 2, on the male member 4. The segments 28 are used to form ribs 78 on the container 70 to be described in connection with FIG. 5.

Figure 2:
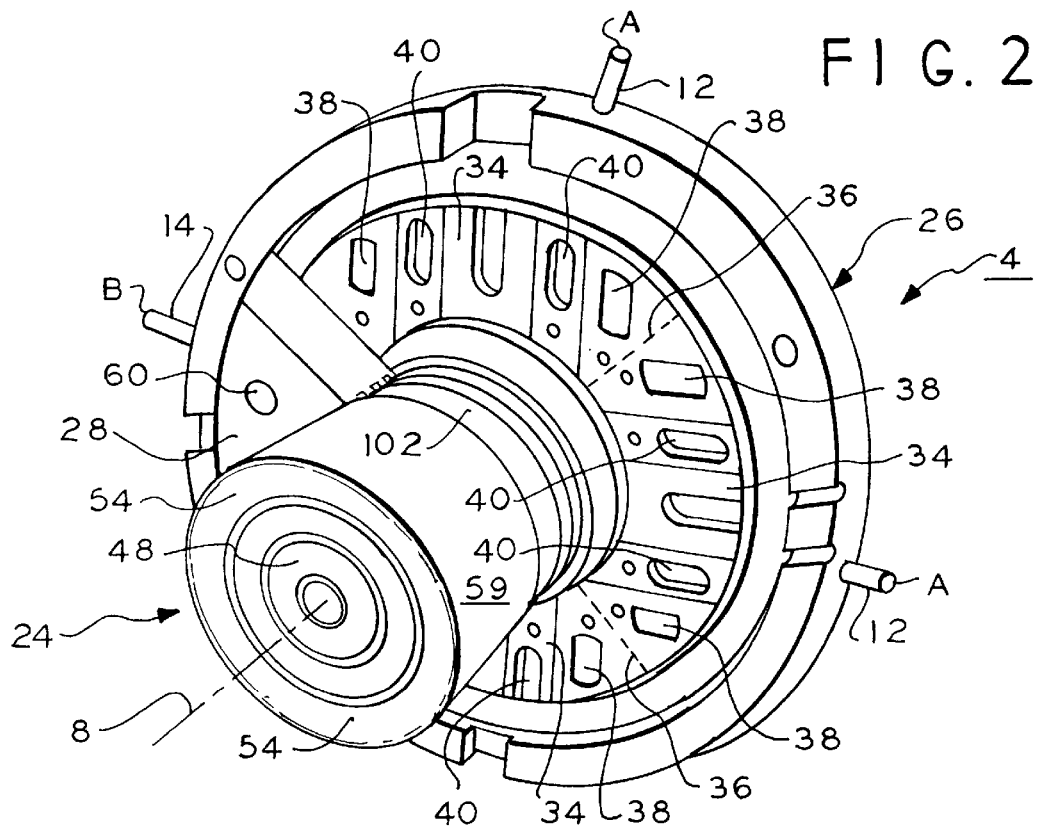
FIG. 2 is an perspective view of a portion of the male mold member of FIG. 1 illustrating one displacable rib forming jaw segment.
Figure 8:
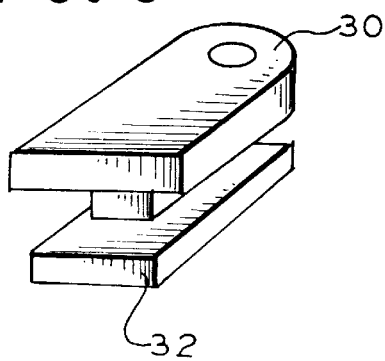
FIG. 8 is an isometric view of a representative slider used in a mating gib to articulate the displaceable male member rib forming segments.

Jaw segments 28 are each mounted on and secured to a respective corresponding slider 30, FIG. 8, which has a foot 32. The foot 32 is slidably secured to a gib 34 on the male member 4, FIGS. 2 and 4. Thus each segment 28 (only one being shown) is radially outwardly displaceable normal to axis 8. The outward position is during the eject portion of the mold cycle and the radial inward position shown in FIG. 2 is during the container forming portion of the cycle. The outline of each of the segments is shown by the dashed lines 36, FIG. 4.

Figure 4:
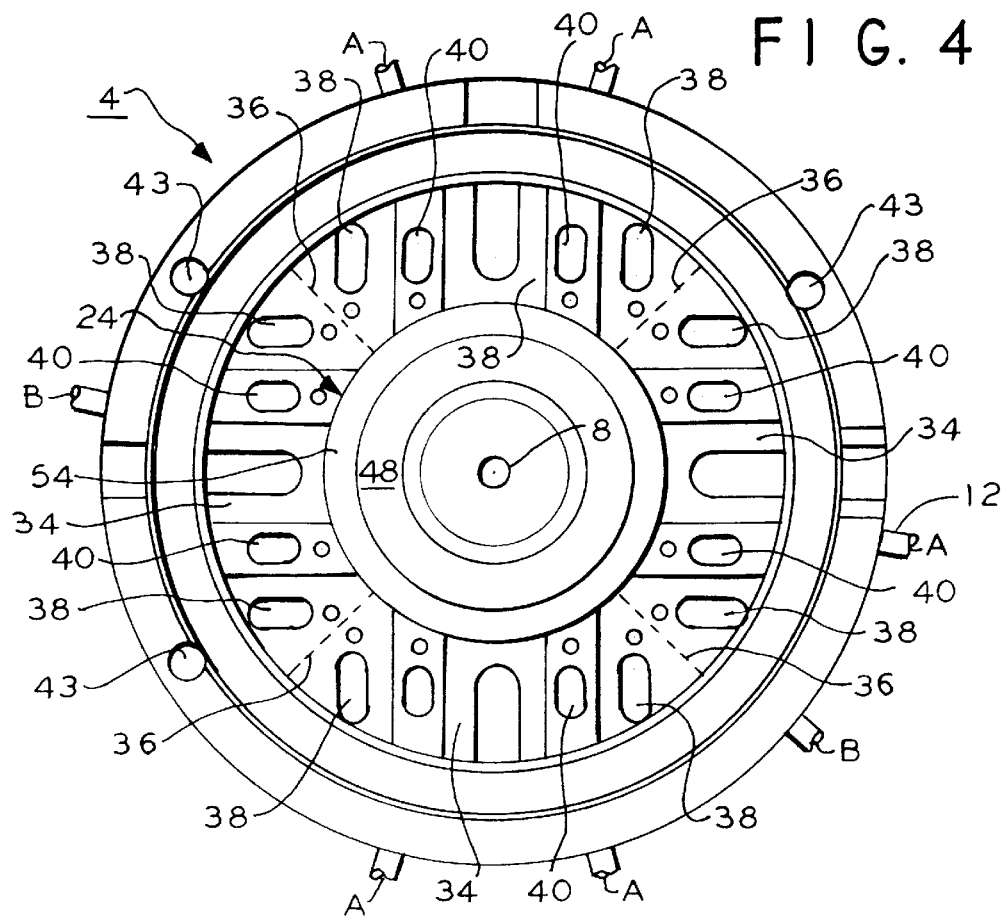
FIG. 4 is an end elevation view of the male mold member with the core but without the displacable forming jaw segments forming the container ribs.

In FIGS. 2 and 4, the ovals 38 represent resilient mechanisms (not shown) located at each oval for resiliently grasping a pin (not shown) on the jaw segments 28. This mechanism frictionally holds the segments in their radial outward extreme position at the time of ejection of the container. When the segments are forced radially inwardly to the molding position, FIG. 2, these friction mechanisms automatically release the pins.

Figure 3:
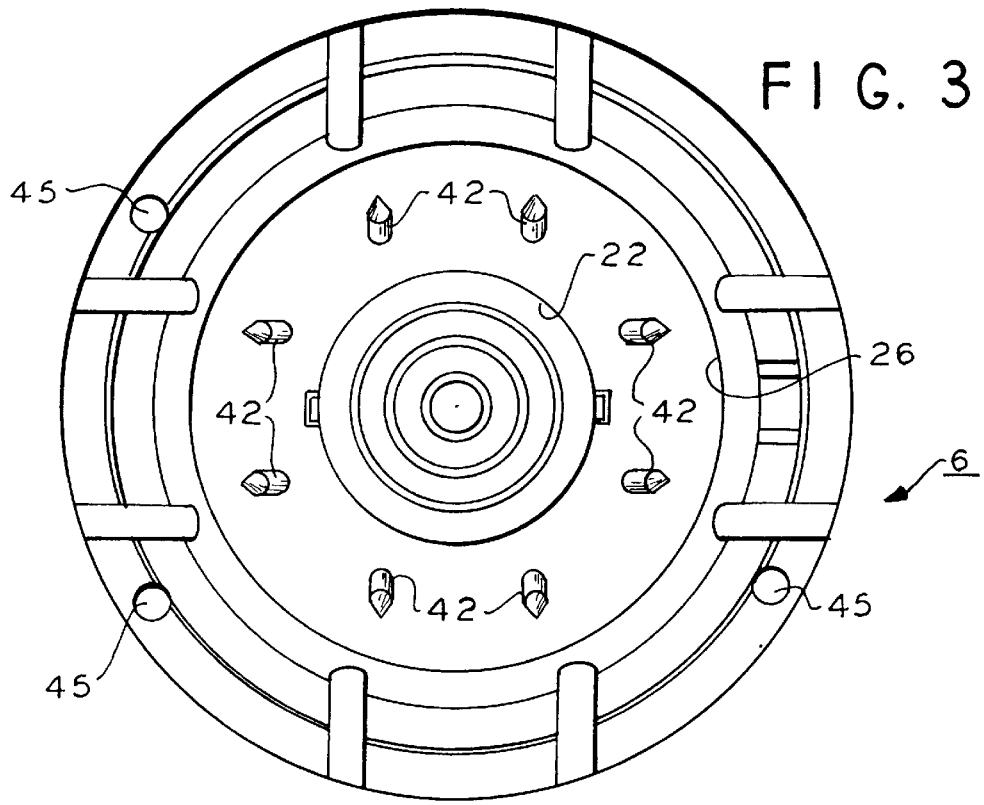
FIG. 3 is an end elevation view of the female mold member of FIG. 1.

A pair of recesses 40 on are on each side of the gibs 34. The recesses receive the tips of the camming pins 42 on the female member 6, FIGS. 1 and 3. Two pins 42 engage corresponding recesses 40 associated with a given segment 28. The pins are inclined about 20° which angle could be more or less according to a given implementation. The pins 42 have an inclination which cams the segments radially inwardly and outwardly as the male member displaces along axis 8, FIG. 1. Opposing segments 28 displace in opposite radial directions and normal to the displacement direction of the next adjacent segments 28.

In FIG. 1, three axially extending guide rods 43 (two being shown) are spaced from each other in 90° sectors about the core 24. Rods 43 mate with bores 45 in the female member 6. These rods and bores align the core 24 with the cavity 22 of the female member 6.

In FIG. 6, core 24 comprises a preferably beryllium copper cylindrical sleeve 44. The sleeve 44 has has an annular shoulder 51 and an axially extending right circular cylindrical radially inner surface 53 terminating at the shoulder 51. The sleeve has a radially outer frusto-conical surface. The sleeve 44 has a planar end surface normal to axis 8 forming a shoulder 93. An annular ring member 57 has a frusto-conical inner surface, a flat surface that abuts shoulder 93 and a circular cylindrical radial outer surface. An 0-ring 52 is at the interface between ring member 57 flat surface and shoulder 93. The 0-ring 52 prevents cooling water at the frusto-conical surface 55 of the sleeve 44 from entering the air gap 50 via the interior surfaces of the sleeve 44 at shoulder 93 and ring member 57.

Interior of the sleeve is an axially displaceable poppet 46 which may be of the same material as the sleeve 44. The poppet 46 has a frusto-conical head 48 which mates with the frusto-conical surface of ring member 57. An air gap 92 is formed by the facing frusto-conical surfaces of the ring member 57 and head 48. The gap 92 terminates at one end at shoulder 93 in an enlarged region radially inwardly of the 0-ring 52 and at a step in the surface of the poppet frustoconical surface spaced from the poppet head 48 end.

The sleeve 44 and poppet 46 mate at the axially extending right circular cylindrical interface surface 53 and at shoulder 51. The poppet 46 axially displaces in direction 62' within the sleeve 44 along axis 8. An axially extending annular elongated cylindrical gap 50 is at the interface surface 51 of the sleeve 44 and poppet 46. The gap 50 terminates at the shoulder 51 at one gap end and at recess 101 at the other gap end.

Figure 5:
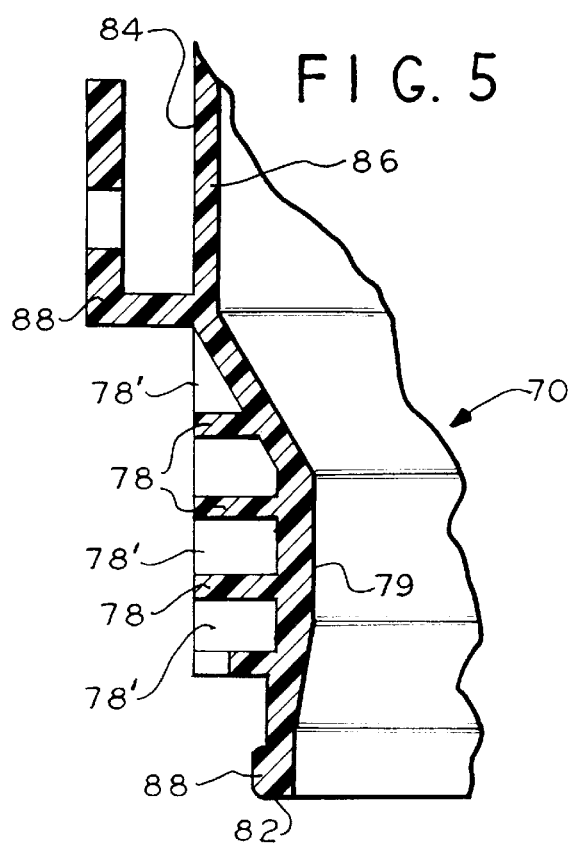
FIG. 5 is a detailed partial sectional elevation view of the rim portion of a container molded by the mold of FIG. 1.

The core 24 includes a cylindrical member 54, preferably beryllium copper or stainless steel, radially outwardly the sleeve 44. The member 54 has a right circular cylindrical outer surface 59 parallel to axis 8 for forming a major portion of the container 70 side wall 86 (FIG. 5). The member 54 has an inner frusto-conical surface that mates with the member 44 surface 55. The member 54 has an annular groove 102 at an end thereof. The other end terminates in a surface for forming the radially outer portion of the bottom wall 72 (FIG. 7) of the container 70.

An annular ring member 61 is at the base of the core member 24. The member 54 forms a portion of the groove 102 for forming therewith an inwardly extending portion of the inner side of side wall of the container 70 at the container rim 82 (FIG. 5). The ring member 61 abuts the member 54 at a planar interface 94 therebetween at the core base region. The segments 28 are radially aligned with the groove 102.

An 0-ring 56 is at the interface of sleeve 44 and outer cylindrical member 54 for sealing cooling water between the sleeve 44 and member 54 in the region to 0-ring 52. The sleeve 44 and outer member 54 are secured in fixed relation. Cooling water is supplied to spiral cooling conduits 58 in the female and male members, in the poppet (not shown), ring member 61, sleeve and other structures of the mold 2. Only some of the cooling conduits are shown for simplicity of illustration.

Eight camming pins 42, one being shown in FIG. 6, are secured to female member 6 by a set screw. Each pin 42 engages a corresponding inclined aperture 60 in a jaw segment 28, each segment having a pair of such apertures for receiving a pair of respective pins 42. The planes of the pins 42 and the corresponding mating apertures 60 are axially aligned. These planes are parallel to and spaced from axis 8. As the male member displaces out of engagement with the female cavity 22 in axial direction 62, the jaw segment 28 engaged therewith is cammed in the radial outward direction 64. This is shown by the position of the jaw segments 28 in FIG. 7.

The base of the female cavity 22 is formed by mold disc member 66, preferably beryllium copper or stainless steel. An air operated poppet 68 is secured to member 66. Poppet 68 releases the container 70 bottom wall 72 after the plastic material has solidified sufficiently during the release portion of the mold cycle.

A sprue forming member 74 is attached to the base member 76 of the female member 6. Molten plastic material 77 is fed through sprue member 74 into the cavity 22 between the cavity 22 and the core 24 member 54 forming container 70.

The jaw segments 28 have ribs 80 which form complementary ribs 78, FIG. 5, on the container 70 adjacent to its rim 82 at recess 102 aligned therewith. The segments 28 also include axially extending slots for forming axially extending ribs 78'intersecting and integral with the annular ribs 78. The outer edges of the ribs 78, 78'are coextensive with the outer surface 84 of the major portion of the container 70 sidewall 86, which is a right circular cylinder. A handle or bail receiving projection 88 extends radially outwardly from the sidewall 86 for receiving a wire bail as used in prior art metal paint cans. A lip 88 is formed at the rim 82 edge for engaging a container 70 lid (not shown) and for securing the lid to the container 70. The ring member 61 forms the rim edge of the container 70.

The container 70 in this embodiment preferably may have a wall thickness in the range of about 0.020 to 0.075 inches and a length of about 6.8 inches. The container has an internal diameter of about 6.6 inches, which dimensions are given by way of example.

In FIG. 6, an air inlet conduit 90 supplies pressurized air to gap 50 which is in fluid communication with annular frusto-conical gap 92 between the poppet head 48 and the sleeve 44 facing shoulders 93. The pressurized air is supplied via source 18, FIG. 1 and control 16 at a preferred pressure of about 80 psi, but could be in a range of 40 to 100 psi. Conduit 90 is also in fluid communication with the interface between the outer member 54 and the ring member 61 at the annular planar disc--like radially extending slit 94. The slit 94 is at the rib forming region for ribs 78 in communication with the groove 102.

A collar 96 is attached by keys to the end of the poppet 46. A spring 98 is between the collar 96 and the male member body 100 in recess 101 in the body 100. In the alternative, a compressible rubber pad or other resilient member could be used in place of the collar and spring. The collar 98 limits the extent of axial travel of the poppet 46 in direction 62'for releasing the container 70 as will be explained. The core 24 member 54 annular groove 102 forms the inwardly extending portion of the container, step portion 79, FIG. 5.

In operation, in FIG. 6, the mold 2 is closed with the male member core 24 seated in the cavity 22 of the female member 6. The four jaw segments 28 (two being shown in this Figure) are in their radial inward position in a direction opposite directions 64. They are placed in this position by the action of the camming pins 42 engaged with the apertures 60 in the segments 28 when the mold is closed.

When the mold is open, as shown in FIG. 1, guide rods 43 engage bores 45 aligning the core 24 with the cavity 22. In the interim, the resilient mechanisms in ovals 38 (FIG. 4) hold the jaw segments 28 in their radially outward position (not shown) so that the cam pins 42 (FIGS. 3 and 6) are aligned with the corresponding respective apertures 60 in the segments 28 (FIGS. 2 and 6). The recesses 40 in the male member receive the tips of the pins 42 in the closed state of FIG. 6. As the core 24 is displaced in direction 62', FIG. 1, the inclined camming pins 42 engage the apertures 60 in the jaw segments and cam the segments radially inwardly, directions 64', FIG. 6. This action releases the pin gripping mechanisms in ovals 38 of the male member (FIG. 4). Those mechanisms merely serve to insure the segments 28 apertures 60 are aligned with the camming pins 42 until they engage the apertures 60 as the mold closes.

The segments 28 thus reach the closed position of FIG. 6 when the male core 24 is fully engaged in the cavity 22. In this position, the segments 28 define the rib and lip 88 cavities for ribs 78 of the container (FIG. 5). The core 24 is spaced from the female cavity 22 wall an amount to produce the desired container wall thickness. The core 24 and the mating female cavity 22 are right circular cylinders with no draft angle. The core groove 102 receives the ribs 80 of the segments 28 in the closed position of FIG. 6. The female cavity 26 receives the closed jaw segments 28.

In the mold closed state of FIG. 6, the molten thermoplastic material is forced through the sprue member 74 orifice into engagement with the spaces between the core 24 and the female mold. The mold surfaces at the core 24 and female mold cavities have a temperature in the range of preferably 80°–130° F. To maintain these temperatures, the cooling water in the mold is at the range noted above herein with the molten plastic at the temperature noted above. The thermoplastic material of the container 70 in contrast is at about 130°–160° F, with the rib end of the container being the hottest.

In a typical mold cycle for the illustrated container, about 11 seconds are used to fill, pack and cool the plastic material 77 into the mold spaces forming the container 70. The male core 24 is then withdrawn from the female cavities in direction 62. When the core 24 is partially withdrawn, for example, when the poppet head 48 is about four inches from the female cavity bottom wall formed by member 66, pressurized air is supplied by control 16 (FIG. 1) to conduit 90. This air forces the poppet 46 at shoulder 51 to axial displace in direction 62' as shown in FIG. 7 relative to the sleeve 44 of the core 24. The air travels along the gap 50 therebetween to the gap 92. The pressurized air against the head 48 displaces the head allowing the pressurized air to escape via gap 92 in an annular pressurized air stream against the container bottom wall 72, FIG. 7. At the same time the core is continuing to displace out of the female cavities.

During the axial withdrawal of the core 24, the inclined camming pins 42 engaged with the jaw segments 28 force the segments 28 radially outwardly in directions 64. This action frees the ribs 80 of the segments 28 from the formed container ribs 78 in the axial direction. This permits the container to be slid along the core axially.

The portion of the container at the rim aligned with the ribs 78 is originally formed in the groove 102 in the core 24. The axial sliding of the container 70 along the core member 54 radial outer surface 59 during the ejection of the container 70 bends the rib portion of the container 70 radially outwardly as shown in FIG. 7. This stretches the plastic material. The groove 102 has a depth of about 0.200 inches but could have a depth in the range of at least 0.150 inches. These dimensions are based on a 6% stretch of the rib region upon ejection of the container from the core 24. If the diameter of the container differs from the dimensions given herein then the depth of the groove 102 will differ.

The container 70, generally, preferably corresponds to a core 24 groove 102 depth (groove 102 depth) to a container radius (container cavity radius) ratio of at least about 1 to 16 (6%). The depth of the groove 102 is sufficiently great so that it results in about 6% stretching of the rib region of the container 70 during ejection beyond the anticipated yield of the material 77. There is about 6% stretching of the material which at this time is in the above noted temperature range of 130°–160° F.

Surprisingly, the material stretches the 6% value without stress failure contrary to prior art knowledge, has memory and returns to its former molded shape without distortion, cracks or permanent deformation and damage to the container in this region. Because of the mass of the material at the ribs, this rim region of the container 70 tends to be somewhat hotter than the rest of the container 70 at this stage.

The air slit 94 at the rib region provides lubrication to the interface of the container and the core surface permitting the container to slide along the core 24 during ejection. The characteristics of the material 77 is important at this time. The material should be elastic enough to bend and have memory to return to its original state.

Melt index is one parameter to determine the desired state of the plastic material. Melt index is an indirect (coarse) measurement of the molecular weight of the material. Melt index is determined by an ASTM (American society of Testing and Materials) test referred to as the Standard Test Method for Flow Rates for Thermoplastic Extrusion Plastometer. The ASTM test is test D1238 Condition E. A cylinder is heated to a standard predetermined temperature of 190° C. A piston of 7.9 mm diameter and a weight of 2.16 kilograms are placed on the molten plastic material in the cylinder. A small orifice of 2.095 mm diameter and 8 mm in length at the bottom of the cylinder permits the molten plastic material to flow therethrough. The amount of flow for a given time, e.g., ten minutes, is the melt index.

If one gram of plastic extrudes through the orifice this constitutes a 1 melt index. If 10 grams of material extrude through the orifice, this is a ten melt index. To obtain satisfactory stretching of the rib region of the container 70, the melt index should be more than 4 and less than 10 for a polyethylene copolymer.

A second parameter is density. The density should be between 0.952 to 0.955. A homopolymer material has a density of about 0.960 which is too high and causes cracks in the molded material. This material has a lower stress cracking resistance. A homopolymer may be an ethylene and the copolymer may be hexene and ethylene, with a small proportion of hexene.

The cycle times are important. The time when the container is popped off of the core is critical in the cycle. This includes maintaining the core surface at about 100° F and normally no more than about 120° F The mold surface is preferably about 120° F. The plastic material is preferably heated to a melt temperature of about 470° F The material heats up in the barrel of the screw. There are band heaters about the screw barrel. Also, mechanical work is done by the screw in plasticizing the material. It is desired that less heat be generated by shearing action of the screw than by direct heating which causes the 470° F material temperature. Reduced shear to reduce the temperature requires less turns of the screw and generally lower compression. Industry standard screws use a 17° helix. The shearing action increases the melt temperature.

If the mold is too cold, the plastic material will not flow properly. The material may stress during filling the mold. Stresses during molding can cause cracks, e.g., premature stress cracking or failure. The part may also not be able to eject properly because it is cold.

If the material is too hot, it needs more time to cool and lengthens the cooling time and the molding cycle time. If the part is too hot after being ejected from the mold, it may distort. Therefore, the process is critical as to time and temperature of the molding process. Beryllium copper permits desired rapid cooling of the part during the molding process.

When the core is about 4 inches from the female cavity base member 66, the poppet 46 starts to pop off the container. Air is applied to the poppet for this action and is kept on until the core is ready to be returned into engagement with the cavity 22. This is for a period of about 0.5 to 0.75 seconds until the male core clears the female cavity. At this time the container is free of the core 24 and drops of f the mold. Between the start of the opening of the mold until fully closed is preferably about 3 seconds for this embodiment, or a total cycle time of about 14 seconds.

The ribs 78 when provided the desired depth to provide the needed hoop strength of the rim 82 results in stretching the rib region of the container 70 about 6% when the container is ejected from the core 24. The prior art maximum 4% stretch resulted in a rib of too shallow a depth. This resulted in a rim too weak to prevent undesirable deformation during storage, handling and use as a paint storing container. The 0.150–0.200 inch depth and multiple ribs 78 of the rib portion 79 provides this needed added strength for a container of the dimensions given by way of example herein.

The collar 96, FIGS. 6 and 7 determines the maximum displacement of the poppet 46, which in this embodiment is about ⅛ inch. This amount opens up the gap 92 to provide sufficient air volume and pressure in the resultant air stream to blow the container 70 free of the core 24. When the air pressure is removed, the spring 98 returns the poppet to the position of FIG. 6.

It should be understood that modifications may be made to the described process by those of ordinary skill. Such modifications may include for example other cylindrical shapes, threaded jars, tubes which may have enclosed ends that are later removed, and other arrangements in which it is desired to provide a step region in a molded cylinder that extends radially inwardly. The molding process would be one wherein no articulated mold segments need be used for such internal radially inwardly extending step portions of a cylinder. The external jaws for the ribs are relatively lower in cost to implement than such internal segments or jaws.

It is intended that the scope of the invention is as defined in the appended claims.

What is claimed is:

1. A method of molding a thermoplastic cylindrical container comprising:
    providing female and male mold members defining a mold cavity;
    injecting thermoplastic material into said mold cavity for injection molding a one piece polyethylene thermoplastic material cylindrical container having a bottom wall and an annular side wall extending from the bottom wall and terminating at an annular rim, said male member having an annular substantially one piece outer surface for forming the interior surface of said container side wall including at least a portion of the radially inward portion set forth below;
    said injection molding including molding at least one rib extending radially outwardly from said side wall adjacent to said rim;
    molding during said injection molding a radially inwardly extending portion in said side wall aligned with said at least one rib, said radially inwardly extending portion extending a radially inward distance from said side wall an amount sufficient that causes said side wall to stretch at least about 6% in response to ejection of said container from said male member; and
    ejecting the molded container from said mold members, said male member stretching the container side wall said at least about 6% during said ejecting with no permanent deformation of said material.

2. The method of claim 1 wherein said step of molding said at least one rib includes molding a plurality of annular ribs.

3. The method of claim 1 wherein said ejecting said container includes ejecting said container solely with pressurized air while the male member is annularly and axially contiguous with said side wall during said ejecting.

4. The method of claim 1 wherein said step of molding said side wall includes molding said side wall with a thickness of about 0.020–0.075 inches and said molding said radially inwardly extending portion includes molding said radially inwardly extending portion with a depth having a ratio to the radius of the container of at least about 1 to 16.

5. The method of claim 1 wherein said step of ejecting said container includes ejecting said container solely with pressurized air.

6. The method of claim 1 wherein said step of ejecting the container includes disengaging the male member from the female member and ejecting the container from the male member solely with pressurized air.

7. The method of claim 1 wherein the step of molding the at least one rib includes molding the at least one rib with a radial outer edge that is substantially coextensive with the radial outer surface of said side wall.

8. The method of claim 2 wherein the step of molding the plurality of annular ribs includes molding a plurality of axially extending ribs intersecting and integral one piece with said annular ribs.

9. The method of claim 1 wherein the steps of molding said at least one rib and said inwardly extending portion include molding the at least one rib with a depth in the radially outwardly extending direction of about the same value as the radial depth value of said inwardly extending portion from said side wall.

10. The method of claim 9 wherein the molding the radially inwardly extending portion includes molding the depth of the radially inwardly extending portion a value that is at least 1 to 16 relative to the value of the radius of the container.

11. The method of claim 1 including providing a poppet member in the male member, axially displacing the poppet member with pressurized air to release the pressurized air in a stream and ejecting the container from the male member with said released pressurized air stream.

12. The method of claim 1 wherein the step of molding the container includes molding the container with thermoplastic material having a density in the range of about 0.952 to 0.955 and a melt index of about 4–10.

13. A method of molding a thermoplastic cylindrical container comprising:
    providing female and male members defining a mold cavity;
    injecting thermoplastic material into said mold cavity for injection molding a one piece polyethylene thermoplastic material right circular cylindrical container having a bottom wall and an annular side wall extending from the bottom wall and terminating at a annular rim, said mold male member having an annular substantially one piece surface for forming the interior surface of said side wall including at least a portion of the radially inwardly extending portion set forth below;
    said injection molding including molding at least one circular rib extending radially outwardly a given distance from said side wall adjacent to said rim;
    molding during said injection molding a radially inwardly extending portion in said side wall aligned with said at least one rib, said radially inwardly extending portion extending a radially inward distance from said side wall in engagement with the male member including said one piece surface, said inward distance having a value sufficient to stretch said side wall at least about 6% in response to said engagement with the male member during ejection of said container from said male member; and
    ejecting the molded container from said mold members, said male member stretching the container side wall said at least about 6% during said ejecting with no permanent deformation of said material.

14. The method of claim 13 wherein the molding the side wall includes molding the radially inward distance substantially the same value as said given distance.

15. The method of claim 13 wherein the step of molding the container includes molding the side wall with a thickness of about 0.060 inches and molding said radial inward distance with a value of at least about 0.150 inches.

16. The method of claim 13 wherein the step of ejecting includes the step of ejecting the container from the male member solely with pressurized air.

17. The method of claim 13 wherein the step of molding the container includes molding said rim with a lip for attaching a lid to the container.

18. The method of claim 13 wherein said step of molding at least one rib includes molding a plurality of said at least one rib and a plurality of further ribs extending axially the container and intersecting said plurality of at least one rib.

19. The method of claim 13 wherein the steps of injection molding and electing the molded container include molding the container so that the thermoplastic material of the container has a temperature range of about 130° to 160° F. at the time of ejection of the container from the mold.

20. A method of molding a thermoplastic cylindrical container comprising:

provic female and male mold members defining a mold cavity;

injection molding in the mold cavity a one piece polyethylene copolymer thermoplastic material right circular cylindrical container having a bottom wall and an annular side wall extending from the bottom wall and terminating at an annular rim, said mold male member having an annular substantially one piece surface for forming the interior surface of said side wall including at least a portion of the radially inwardly extending portion set forth below;

molding during said injection molding a plurality of annular parallel ribs extending radially outwardly a given distance from said side wall adjacent to said rim; and molding during said injection molding in said side wall a radially inwardly extending portion aligned with said plurality of ribs, said radially inwardly extending portion extending a radially inward distance from said side wall an amount sufficient that causes said side wall to stretch at least about 6% in response to engagement of the inwardly extending portion with the male member during ejection of said container from said male member; and ejecting the molded container from said mold members solely with pressurized air, said male member stretching the container side wall said at least about 6% during said electing with no permanent deformation of said material.

* * * * *